(12) United States Patent
Pon

(10) Patent No.: US 9,285,478 B2
(45) Date of Patent: Mar. 15, 2016

(54) MULTIPATH DETECTION FOR RECEIVED SPS SIGNAL

(75) Inventor: Rayman Wai Pon, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 982 days.

(21) Appl. No.: 12/034,597

(22) Filed: Feb. 20, 2008

(65) Prior Publication Data

US 2009/0207891 A1 Aug. 20, 2009

(51) Int. Cl.
*G01S 19/22* (2010.01)
*G01S 19/30* (2010.01)

(52) U.S. Cl.
CPC *G01S 19/22* (2013.01); *G01S 19/30* (2013.01)

(58) Field of Classification Search
CPC ........ H04B 1/709; H04B 1/711; H04B 1/707; H04B 1/7115
USPC ................. 375/147–150; 342/357.69–357.73
See application file for complete search history.

(56) References Cited

U.S. PATENT DOCUMENTS

| 5,999,561 | A  | * | 12/1999 | Naden et al. ................. 375/142 |
| 6,775,252 | B1 | * | 8/2004  | Bayley .......................... 370/328 |
| 7,764,226 | B1 | * | 7/2010  | Veitsel et al. ............. 342/357.73 |
| 8,571,088 | B2 | * | 10/2013 | Pon .............................. 375/150 |
| 2003/0207681 | A1 | * | 11/2003 | Rowitch ..................... 455/404.2 |
| 2006/0034393 | A1 | * | 2/2006  | Camp, Jr. ..................... 375/324 |
| 2007/0258511 | A1 | * | 11/2007 | Knight et al. ................. 375/149 |
| 2008/0089393 | A1 | * | 4/2008  | Opperman ..................... 375/141 |
| 2008/0159198 | A1 | * | 7/2008  | Chen et al. .................... 370/315 |
| 2009/0121928 | A1 |   | 5/2009  | Pon |
| 2010/0061427 | A1 | * | 3/2010  | Lopez-Risueno et al. .... 375/150 |
| 2010/0135364 | A1 | * | 6/2010  | Hodgart ........................ 375/147 |
| 2012/0026039 | A1 | * | 2/2012  | Ganeshan et al. ....... 342/357.73 |

FOREIGN PATENT DOCUMENTS

| CN | 1128064 A | 7/1996 |
| CN | 1759540 A | 4/2006 |
| EP | 0892277 A2 | 1/1999 |

(Continued)

OTHER PUBLICATIONS

Sanghun Kim; Seungsoo Yoo; Seokho Yoon; Sun Yong Kim; , "A Novel Unambiguous Multipath Mitigation Scheme for BOC(kn, n) Tracking in GNSS," Applications and the Internet Workshops, 2007. SAINT Workshops 2007. International Symposium on , vol., No., pp. 57, Jan. 2007.*

(Continued)

*Primary Examiner* — Don N Vo
*Assistant Examiner* — Eboni Hughes
(74) *Attorney, Agent, or Firm* — Thomas A. Jolly

(57) ABSTRACT

The subject matter disclosed herein relates to detecting and/or estimating multipath signals. For an example, a signal comprising at least one binary offset carrier (BOC) modulation signal is received. The BOC modulation signal is modulated with a pseudorandom noise sequence comprising a plurality of chips, wherein each of said chips has a set interval. In another aspect, the received signal is correlated with portions of the plurality of chips to provide a power signal. The portions of chips are less than the set interval. In a further aspect, presence of a multi-path signal in the received signal is detected. The detection of multipath is based, at least in part, on one or more characteristics of the power signal.

52 Claims, 15 Drawing Sheets

(56) References Cited

FOREIGN PATENT DOCUMENTS

| JP | 2009535640 A | 10/2009 |
|---|---|---|
| RU | 2168274 C1 | 5/2001 |
| RU | 2208916 C1 | 7/2003 |
| WO | WO9813947 A1 | 4/1998 |
| WO | WO-2008054506 A2 | 5/2008 |

OTHER PUBLICATIONS

Nunes, Fernando, Fernando M.G. Sousa, Jose M. N. Leitao, "Multipath Mitigation Technique for BOC Signals Using Gating Functions" ESA Workshop on Satellite Navigation User Equipment Technologies, NAVITEC 2004, European Space Agency, [Online] Dec. 10, 2004.*

Sanghun Kim; Seungsoo Yoo; Seokho Yoon; sunYong Kim. "A Novel Unambiguous Multipath Mitigation Scheme for BOC (kn, n) Tracking in GNSS," Applications and the Internet Workshops, 2007. SAINT Workshops 2007. International Symposium on, pp. 57, Jan. 2007.*

Mohammad Zahidul H. Bhuiyan, Elena Simona Lohan, and Markku Renfors. 2008. Code tracking algorithms for mitigating multipath effects in fading channels for satellite-based positioning. EURASIP J. Adv. Signal Process 2008, Article 88 (Jan. 2008), 17 pages.*

Heiries, V.; Roviras, D.; Calmettes, V.; Ries, L., "An Enhanced Correlation Processing Multipath Mitigation Technique for BOC Signals," Position, Location, and Navigation Symposium, 2006 IEEE/ION, pp. 342-347, Apr. 25-27, 2006.*

Fernando D.N., et al., "Multipath Mitigation technique for BOC Signals Using Gating Functions" ESA Workshop on Satellite Navigation User Equipment Technologies, NAVITEC' 2004, European Space Agency, [Online] Dec. 10, 2004, XP002532258 Noordwi jk, The Netherlands Retrieved from the Internet; URL: ftp://ftp.estec.esa,nl/pub3/tos-ett/na vitec2004/papers/14.1-Nunes .pdf> [retrieved on Jun. 15, 2009] abstract; figures 1-5 , "Proposed code loop" and "Code multipath performance" sections pp. 1-6.

International Search Report and Written Opinion—PCT/US2009/034796, International Search Authority—European Patent Office—Jul. 1, 2009.

Lionel J.G.,"The Shaping Correlator, Novel Multipath Mitigation Technique Applicable to Galileo B0C(1,1) Modulation Waveforms in High Volume Markets" The European Navigation Conference, GNSS 2055, [Online] Jul. 22, 2005, pp. 1-16, XP002532362 Munich, Germany Retrieved from the Internet: URL:http://plan.geomatics.ucalgary.ca/pape rs/ENC05_Munich_Garin.pdf> [retrieved on Jun. 15, 2009] pp. 1-11,14: figures 6-20.

Sousa F M et al., "Strobe Pulse Design for Multipath Mitigation in BOC GNSS Receivers" Apr. 25, 2006; Apr. 25, 2006-Apr. 27, 2006, pp. 348-355, XP010924950.

Fernando D Nunes et al., "Gating Functions for Multipath Mitigation in GNSS BOC Signals" IEEE Transactions on Aerospace and Electronic Systems, IEEE Service Center, Piscataway, NJ, US, vol. 43, No. 3, Jul. 1, 2007, pp. 951-964, XP011197333, ISSN: 0018-9251, Section 11, V I, pp. 952-961; figure 3.

Taiwan Search Report—TW098105534—TIPO—Jul. 11, 2012.

* cited by examiner

MULTIPATH DETECTION FOR RECEIVED SPS SIGNAL

BACKGROUND

1. Field

The subject matter disclosed herein relates to the detection and/or estimation of multipath components for signals received from satellite positioning systems.

2. Information

A satellite positioning system (SPS) typically comprises a system of Earth orbiting satellites enabling entities to determine their location on the Earth based, at least in part, on signals received from the satellites. Such an SPS satellite typically transmits a signal marked with a repeating pseudorandom noise (PRN) code of a set number of chips. For example, a satellite in a constellation of a Global Navigation Satellite System (GNSS) such as GPS or Galileo may transmit a signal marked with a PRN code that is distinguishable from PRN codes transmitted by other satellites in the constellation.

To estimate a location at a receiver, a navigation system may determine pseudorange measurements to satellites "in view" of the receiver using well known techniques based, at least in part, on detections of PRN codes in signals received from the satellites. Such a pseudorange to a satellite may be determined based, at least in part, on a code phase detected in a received signal marked with a PRN code associated with the satellite during a process of acquiring the received signal at a receiver. To acquire the received signal, a navigation system typically correlates the received signal with a locally generated PRN code associated with a satellite. For example, such a navigation system typically correlates such a received signal with multiple code and/or time shifted versions of such a locally generated PRN code. Detection of a particular time and/or code shifted version yielding a correlation result with the highest signal power may indicate a code phase associated with the acquired signal for use in measuring pseudorange as discussed above.

FIG. 1 illustrates an application of an SPS system, whereby a subscriber station 100 in a wireless communications system receives transmissions from satellites 102a, 102b, 102c, 102d in the line of sight to subscriber station 100, and derives time measurements from four or more of the transmissions. Subscriber station 100 may provide such measurements to position determination entity (PDE) 104, which determines the position of the station from the measurements. Alternatively, the subscriber station 100 may determine its own position from this information.

Subscriber station 100 may search for a transmission from a particular satellite by correlating the PRN code for the satellite with a received signal. The received signal typically comprises a composite of transmissions from one or more satellites within a line of sight to a receiver at station 100 in the presence of noise. A correlation is typically performed over an integration time "I" which may be expressed as the product of $N_C$ and M, where $N_C$ is the coherent integration time, and M is the number of coherent integrations which are non-coherently combined. For a particular PRN code, correlation values are typically associated with corresponding PRN code shifts and Doppler bins to define a two-dimensional correlation function.

FIG. 2 depicts an example idealized correlation function for an SPS signal received along a direct line of sight in the absence of interference from multipath signals. For this example the SPS signal is a GPS signal. FIG. 3 provides a close-up view of the example correlation function. Peaks of the correlation function are located and compared to a predetermined noise threshold. The threshold is typically selected so that the false alarm probability (i.e. the probability of falsely detecting a code phase of a received SPS signal) is at or below a predetermined value. The triangular shape of the correlation function of FIG. 3 indicates that there is little or correlation between the received GPS signal and the local replica of the code when the code phase offset is greater than about 1 chip in either direction. The bulk of the power in the correlation function of FIG. 3 occurs within the region between +1 and −1 chips offset from the received direct path GPS code signal.

FIG. 4 is a diagram depicting an autocorrelation function for a direct signal 401 combined with a multipath signal 403 with a positive polarity. The resulting composite signal 405 depicts the effects caused by the reflected multipath signal 403 interfering with the direct path signal 401 as the two signals 401 and 403 are received at an antenna and processed at a receiving device. Although FIG. 4 depicts only a single multipath signal, it is common for multiple multipath signals to contribute to distortions of the direct path signal. In general, multipath signals may comprise a signal from a transmitter that reflect from mountains, buildings, etc., before reaching a receiver. Multipath signals are delayed relative to the direct signal due to the increased distance they travel from the transmitter to the receiver relative to the direct path signal. As a result of the reflections, multipath signals are typically lower in amplitude compared to the direct path signal. For this example, multipath signal 403 adds to direct signal 401 to yield composite signal 405.

Although multipath signal 403 for this example is depicted as having a positive polarity with respect to direct signal 401, it is possible for multipath signals to arrive at the receiver with a polarity opposite that of the direct signal. For the situation where the multipath signal has a polarity opposite that of the direct signal, the resulting composite signal will have a reduced amplitude relative to the direct signal due to the cancellation caused by the negative-polarity multipath signal.

As described above, superposition at the receiver of any additional signal onto the desired direct signal from the satellite during the period of time when signal correlation occurs may distort the autocorrelation function and produce an altered correlation function for the composite signal, such as that depicted by composite signal 405 in FIG. 4. These distortions may lead to errors during correlation tracking functions, which may result in errors in pseudorange measurements, and which may further produce errors in estimated location coordinates for the receiver.

SUMMARY

In one aspect, a signal comprising at least one binary offset carrier (BOC) modulation signal is received. The BOC modulation signal is modulated with a pseudorandom noise sequence comprising a plurality of chips, wherein each of said chips has a set interval.

In another aspect, the received signal is correlated with portions of the plurality of chips to provide a power signal. The portions of chips are less than the set interval.

In a further aspect, presence of a multi-path signal in the received signal is detected. The detection of multipath is based, at least in part, on one or more characteristics of the power signal.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
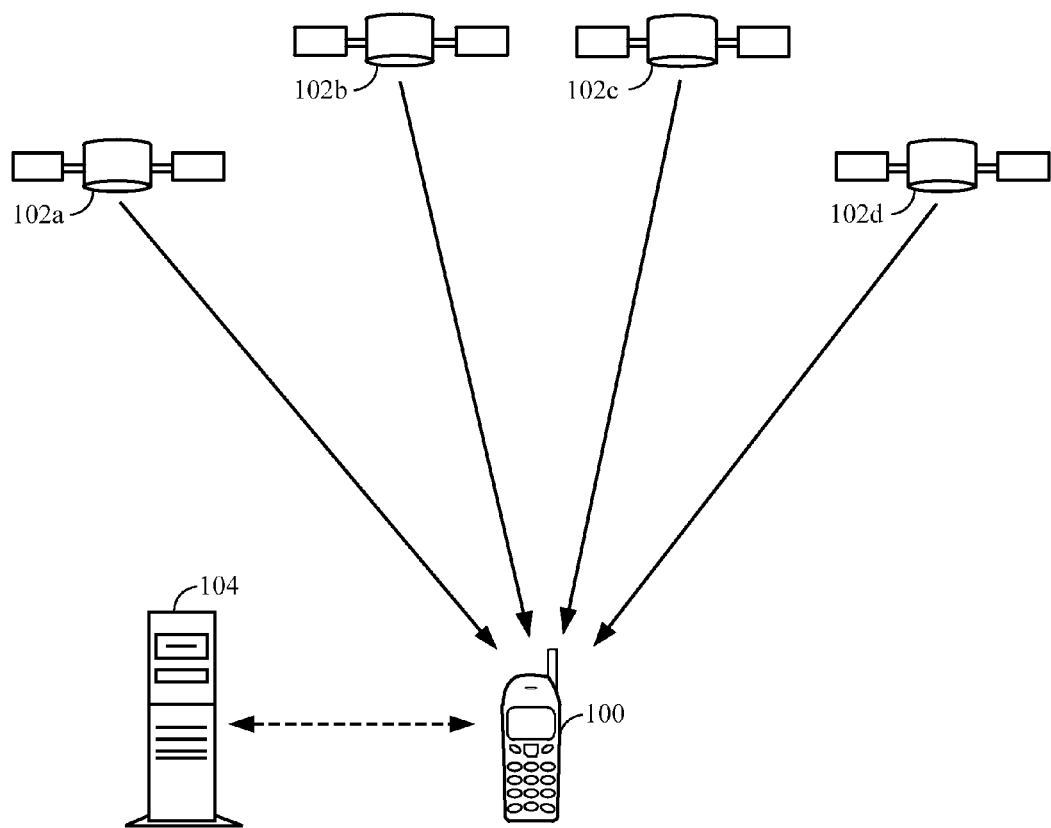
FIG. 1 is a block diagram of an example of a satellite positioning system (SPS).

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular example implementations. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN. For an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in a GPS and/or Galileo type of SPS as specific illustrations according to particular examples, it should be understood that these techniques may also apply to other types of SPS, and that claimed subject matter is not limited in this respect.

For one example, a device and/or system may estimate its location based, at least in part, on signals received from satellites. In particular, such a device and/or system may obtain "pseudorange" measurements comprising approximations of distances between associated satellites and a navigation satellite receiver. In a particular example, such a pseudorange may be determined at a receiver that is capable of processing signals from one or more satellites as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the satellite's orbital parameters, these positions can be calculated for any point in time. A pseudorange measurement may then be determined based, at least in part, on the time a signal travels from an satellite to the receiver, multiplied by the speed of light. While techniques described herein may be provided as implementations of location determination in a GPS and/or Galileo type of SPS as specific illustrations, it should be understood that these techniques may also apply to other types of SPS, and that claimed subject matter is not limited in this respect.

Techniques described herein may be used with any one of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites are useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising satellites transmitting synchronized navigation signals according to a common signaling format. Such a GNSS may comprise, for example, a constellation of satellites in synchronized orbits to transmit navigation signals to locations on a vast portion of the Earth's surface simultaneously from multiple satellites in the constellation. A satellite which is a member of a particular GNSS constellation typically transmits navigation signals in a format that is unique to the particular GNSS format. Accordingly, techniques for acquiring a navigation signal transmitted by a satellite in a first GNSS may be altered for acquiring a navigation signal transmitted by a satellite in a second GNSS. In a particular example, although claimed subject matter is not limited in this respect, it should be understood that GPS, Galileo and Glonass each represent a GNSS which is distinct from the other two named SPS. However, these are merely examples of SPS associated with distinct GNSS and claimed subject matter is not limited in this respect.

For an example, a navigation receiver may obtain a pseudorange measurement to a particular satellite based, at least in part, on an acquisition of a signal from the particular satellite which is encoded with a periodically repeating PRN code sequence. Acquisition of such a signal may comprise detecting a "code phase" which is referenced to time and associated with a point in the PRN code sequence. In one particular example, such a code phase may be referenced to a state of a locally generated clock signal and a particular chip in the PRN code sequence. However, this is merely an example of how a code phase may be represented and claimed subject matter is not limited in this respect.

To detect code phase in a received SPS signal, a navigation system may correlate the received signal with multiple code and/or time shifted versions of locally generated PRN code sequence associated with "code phase hypotheses" spanning an entire period of a periodically repeating PRN code sequence. In a particular example of a Galileo signal, a PRN code sequence may comprise 4,092 chips and repeats every four milliseconds. The PRN code sequence may be modulated with a 1.023 MHz square wave to produce a BOC (1,1) signal (discussed below). Accordingly, to detect a code phase of a signal received from a Galileo transmitter, a navigation system may correlate the received signal with 4,092 or more versions of a locally generated BOC sequence derived from a PRN code sequence associated with the Galileo transmitter, phase shifted at increments of a single chip or smaller.

Figure 4:
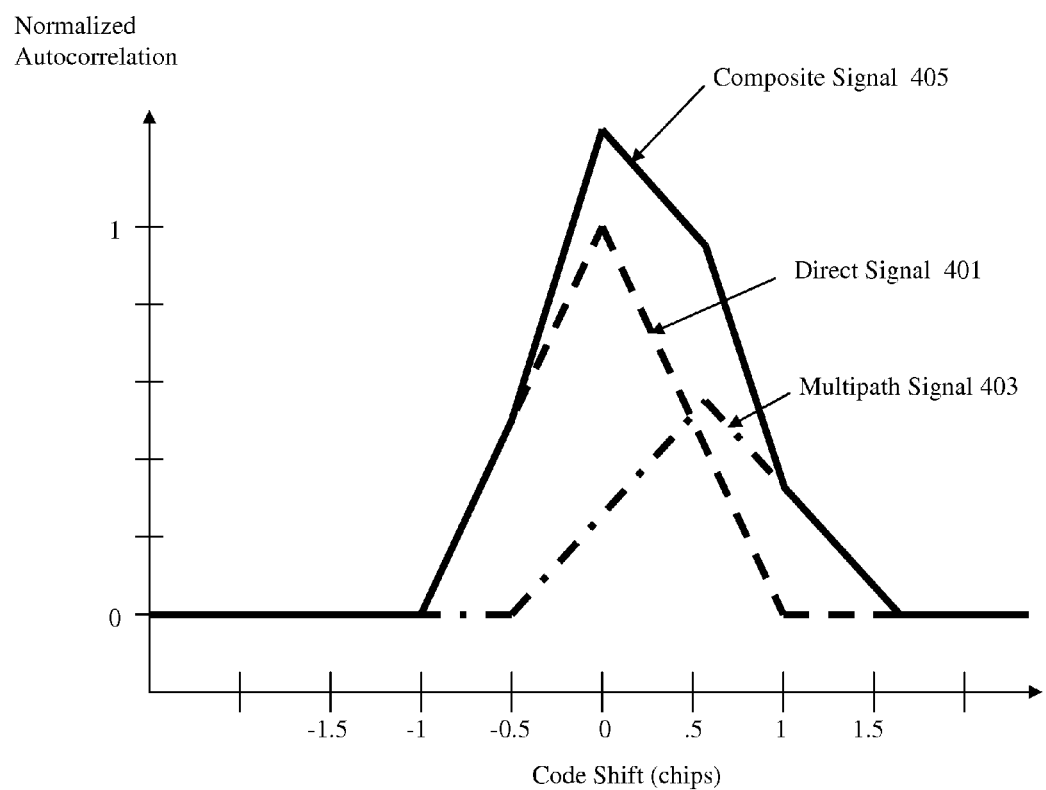
FIG. 4 is a diagram depicting an autocorrelation function for a direct SPS signal combined with a multipath signal with a positive polarity.

As discussed above, it is common for multiple multipath signals to contribute to distortions of a direct path signal received from an SPS satellite at a receiver. Returning again to FIG. 4, an example is shown where multipath signal 403 adds to direct signal 401 to yield composite signal 405. The difference between composite signal 405 and direct signal 401 may be referred to as multipath error.

As also described above, the distortions caused by multipath signals may lead to errors during correlation tracking functions, which may result in errors in pseudorange measurements, which may in turn further produce errors in estimated location coordinates for the receiver.

Figure 5:
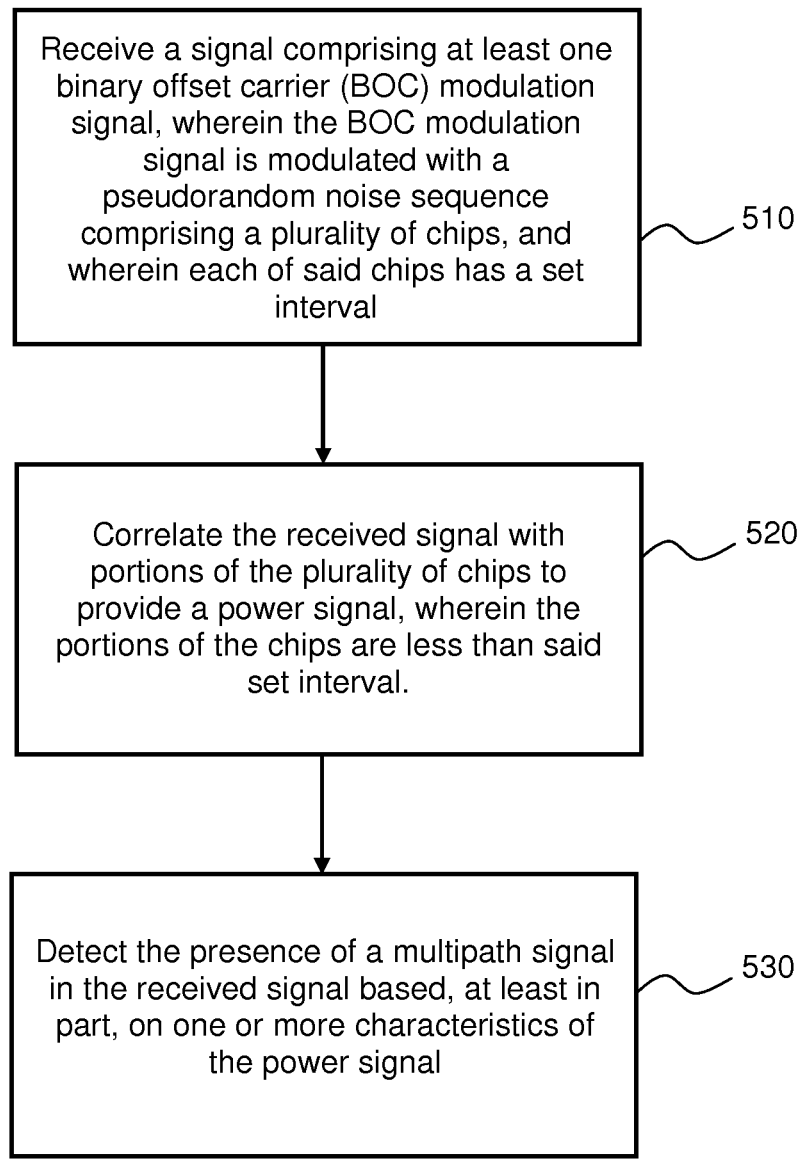
FIG. 5 is a flow diagram of an example of a method for autocorrelation of a BOC signal to detect multipath signal.

FIG. 5 is a flow diagram of an example of a method for detecting multipath components in a received SPS signal. At block 510, a signal is received, wherein the signal comprises at least one binary offset carrier (BOC) modulation signal. The BOC modulation signal may be modulated with a pseudorandom noise sequence comprising a plurality of chips, wherein each of said chips has a set interval. At block 520, the received signal is correlated with portions of the plurality of chips to provide a power signal. The portions of the chips are less than said set interval. At block 530, the presence of a multipath signal is detected in the received signal based, at least in part, on one or more characteristics of the power signal. A method in accordance with claimed subject matter may include all, more than all, or less than all of blocks 510-530, and the scope of the claimed subject matter is not limited in this respect. In one implementation, all or a portion of the example method depicted in FIG. 5, as well as other examples described herein, may be performed by a subscriber station such as that described below in connection with FIG. 15.

For one example, the portion of the plurality of chips used in correlation may include a first half region. The first half region may comprise approximately one-half of a chip period ranging from the beginning of the chip period to approximately the middle of the chip period for each of the plurality of chips of a code sequence of the binary offset carrier (BOC) modulation signal. For another example, the portion of the plurality of chips used in correlation may include a second half region. The second half region may comprise approximately one-half of a chip period ranging from approximately the middle of the chip period to the end of the chip period. However, these are merely examples of possible regions, and the scope of the claimed subject matter is not limited in this respect.

For an example, the binary offset carrier modulation signal may comprise a BOC(1,1) signal derived at least in part from a pseudo-random noise signal. The BOC(1,1) signal may be received from a satellite, for an example. Also for an example, the satellite may comprise a Galileo satellite, although the scope of the claimed subject matter is not limited in this respect. Further, the BOC signal may be received at a subscriber station, such as subscriber station 100 described above.

Also, for one example, the regions may be defined by programmable parameters. For one implementation, such parameters may be stored in a memory device at a subscriber station, for example memory 1530 described below, although the scope of the claimed subject matter is not limited in this respect. Programmable parameters for some examples may include, but are not limited to, a parameter specifying either the first half chip period or the second half chip period and/or a parameter specifying a region size.

For an example, a receiver may receive an SPS signal encoded with a periodically repeating PRN code from a satellite. For one or more implementations, the PRN code may be encoded according to a binary offset carrier (BOC) modulation signal. To acquire the first signal, such a receiver may detect a Doppler frequency in the received signal while correlating code and/or time-shifted versions of a locally generated code sequence with the received first signal. In a particular example where the first satellite transmits an SPS signal encoded with a periodically repeating PRN code 4,092 chips long, the received signal may be correlated over as many as 4,092 or more versions of an associated locally generated code sequence, code and/or time-shifted in single chip or smaller increments. However, this is merely an example of how a signal from a satellite of a particular SPS may be acquired, and claimed subject matter is not limited in this respect. Such a correlation operation for a BOC(1,1) modulated PRN signal may be expressed according to relation (1) as follows:

$$CP = h \text{ for Max} \left[ \sum_{j=0}^{m-1} \int_{t=t1}^{t=t2} Chip_{j-h^*} RS_j dt \right], \quad (1)$$

where $h \in \{0, 1, \ldots, m-1\}$ where:
m=number of chips in a periodically repeating PRN code sequence of a signal received from a satellite;
CP=code phase detected in signal received from the satellite at a reference time;
$Chip_i$=$i^{th}$ chip in locally generated PRN code sequence for the satellite, 0≤i<m;
$RS_i$=$i^{th}$ segment in signal received from the satellite, 0≤i<m; and
t1, t2=period of the chip over which the integration is performed.

As may be observed from relation (1) above, h is within a search range of 0 to m−1, entailing performing an m number of correlation operations on a signal received from the satellite to exhaustively search code phase hypotheses in an entire PRN code interval for detecting a maximum correlation result.

The term "power signal" as used herein may denote an output of a correlation function. For an example, referring to relation 1 above, a power signal may comprise the summation of the m integrations performed over the period from t1 to t2 for the chips in the code sequence.

Figure 6:
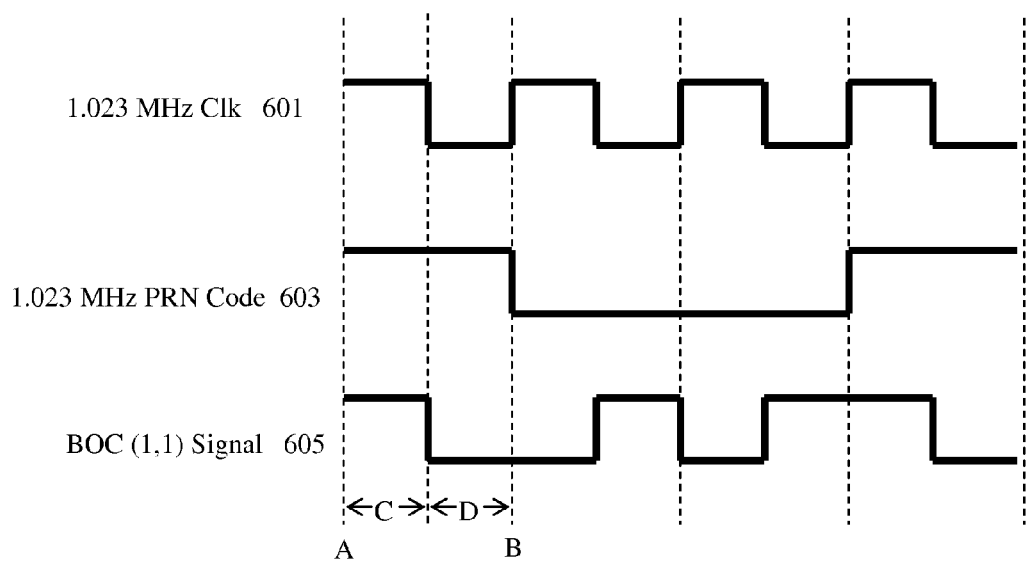
FIG. 6 is an example timing diagram depicting the formation of a binary offset carrier signal (BOC) derived from a PRN code sequence.

FIG. 6 is an example timing diagram depicting the formation of a binary offset carrier (BOC) signal derived from a PRN code sequence. While the GPS course/acquisition (C/A) code comprises a binary phase shift keying signal with a chipping rate of 1.023 MHz, a Galileo GNSS may utilize a BOC signal. In addition, future GPS satellites may also utilize a BOC signal, such as the L1C signal. For BOC signals, the PRN code is mixed with a square wave at a given subcarrier frequency. The notation BOC(1,1) indicates that the signal has a square wave subcarrier frequency of 1.023 MHz and a chipping rate of 1.023 MHz. The generation of an example BOC(1,1) signal is depicted in FIG. 6. The top line in FIG. 6 is a 1.023 MHz square wave 601, the middle line comprises a portion of an example 1.023 MHz spreading code (PRN code) 603, and the bottom line is a resulting BOC(1,1) signal 605. Although BOC signals are disclosed herein as being used in the Galileo GNSS, other implementations may comprise BOC signals used with other satellite positioning systems, and the scope of the claimed subject matter is not limited in this respect. Further, although examples are described herein using BOC(1,1) signals, other BOC variation may be used in other examples. For instance, an example may utilize a BOC (5,1) signal, although the scope of the claimed subject matter is not limited in this respect.

Figure 2:
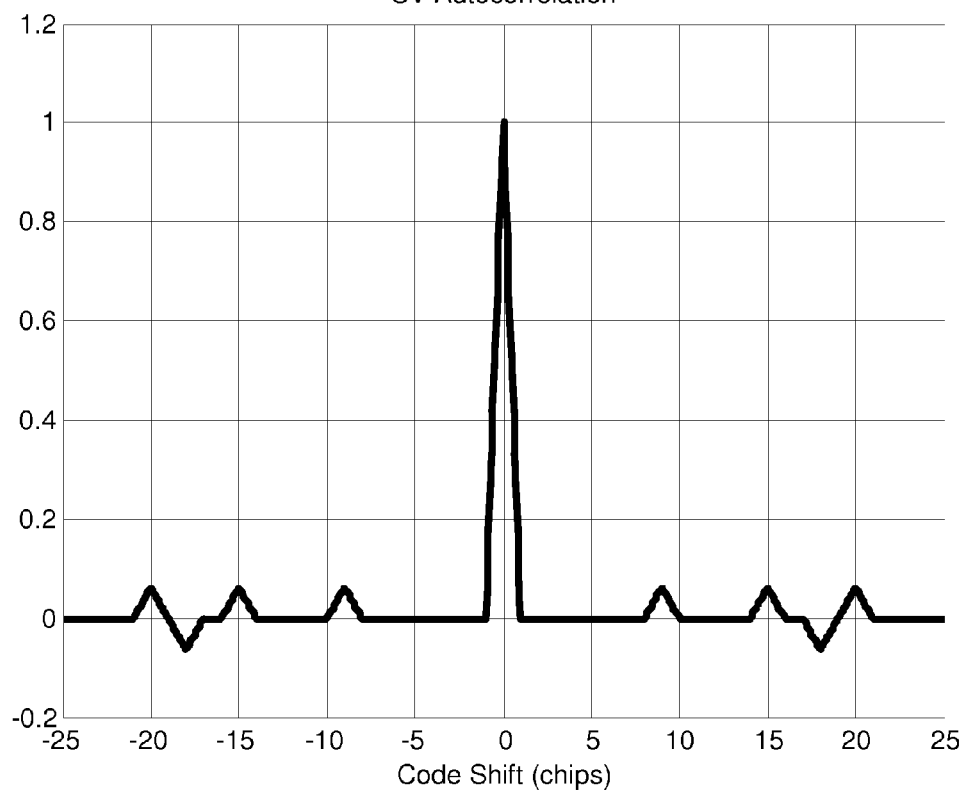
FIG. 2 is a diagram depicting an autocorrelation function for an SPS signal.
Figure 3:
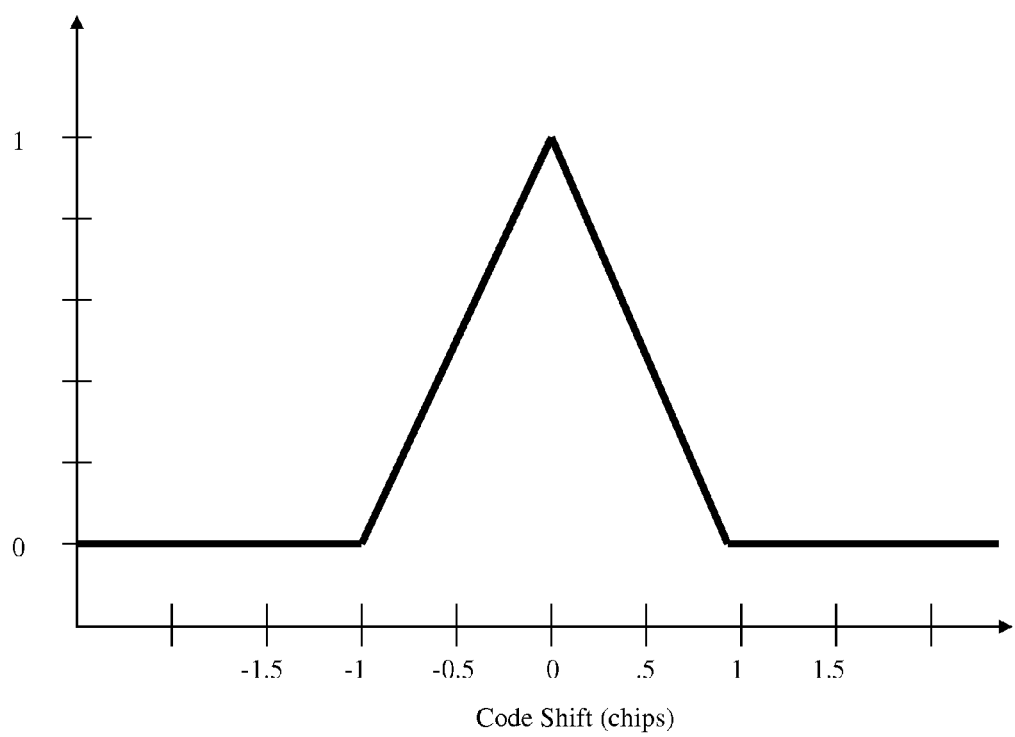
FIG. 3 is a diagram depicting a close-up view of an autocorrelation function for an SPS signal.
Figure 7:
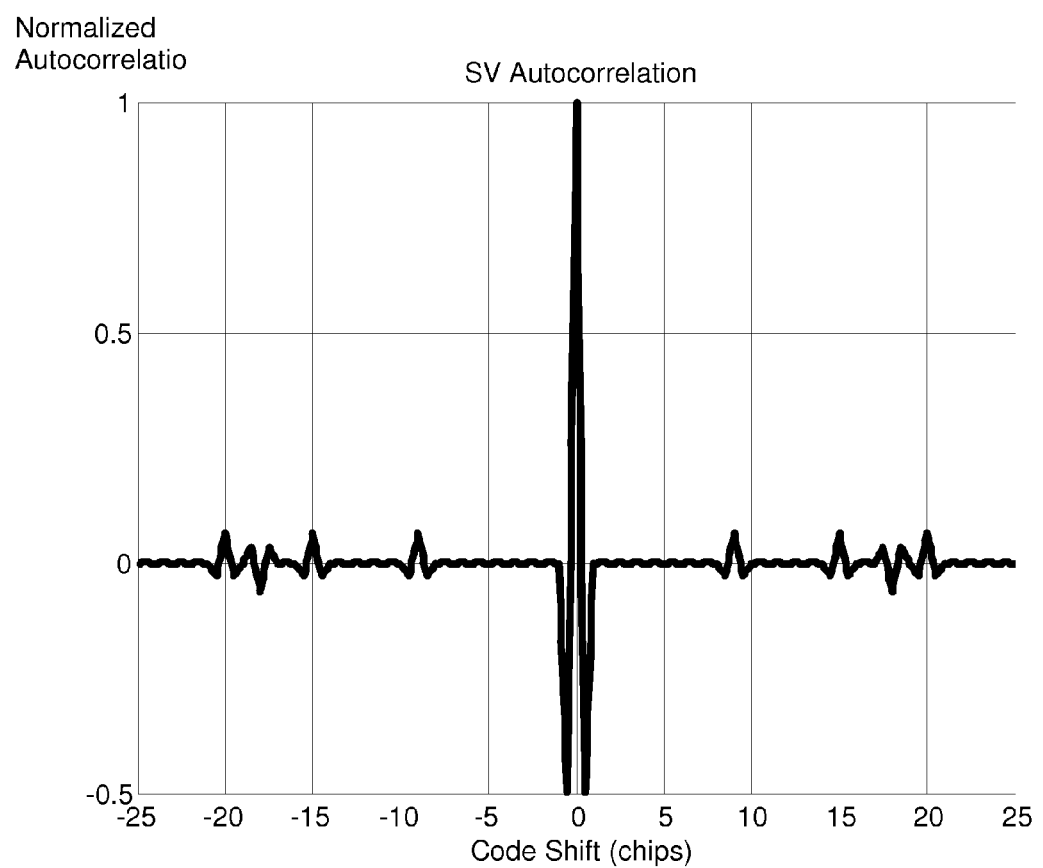
FIG. 7 is a diagram depicting an autocorrelation function for a BOC signal derived from a PRN code sequence.
Figure 8:
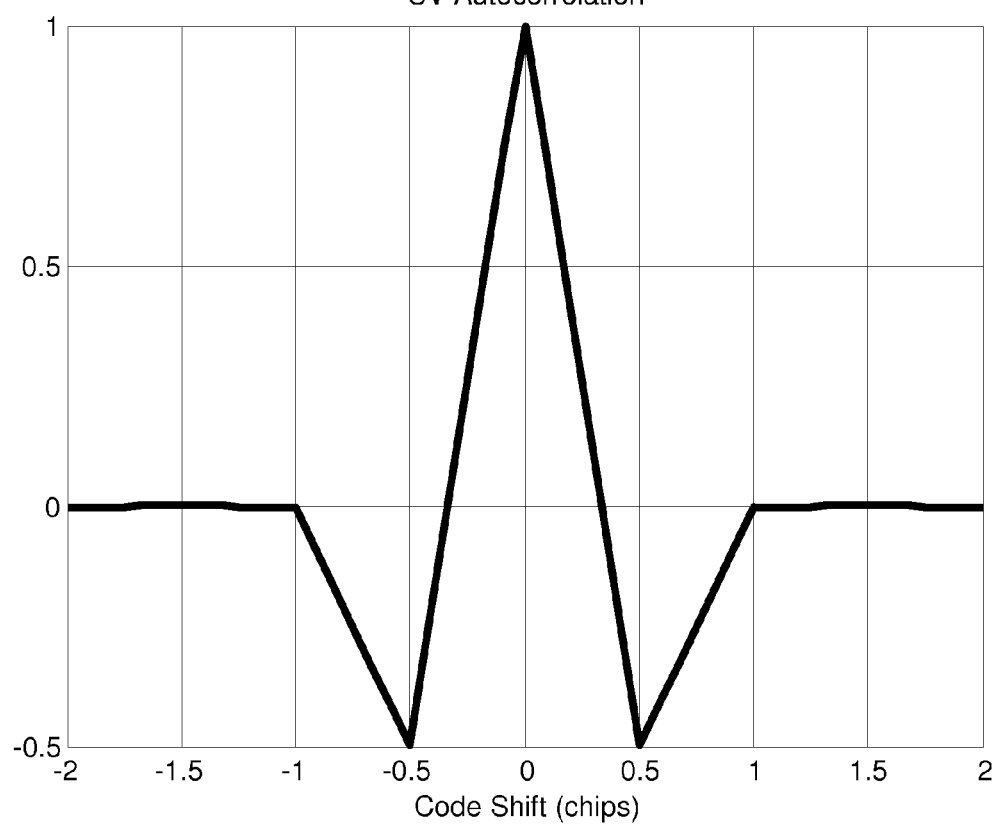
FIG. 8 is a diagram depicting a close-up view of an autocorrelation function for a BOC signal.

FIG. 7 is a diagram depicting an autocorrelation function for a BOC(1,1) signal derived from a PRN code sequence, and FIG. 8 is a close-up view of the autocorrelation function. Compared with the GPS signal autocorrelation function depicted in FIGS. 2-3, the square wave subcarrier modulation used with BOC(1,1) causes the autocorrelation function depicted in FIGS. 7-8 to have a sharper main peak and two smaller negative sidelobe peaks. Compared to the GPS autocorrelation function depicted for example in FIGS. 2-3, the main peak of the BOC autocorrelation function has a slope three times steeper. For example, the main peak of the GPS autocorrelation function has a slope of 1 while the main peak of the BOC autocorrelation function has a slope of 3. As can be seen in FIGS. 7-8, the first nulls of the BOC(1,1) autocorrelation function lie at +/−1/3 of a chip from the $0^{th}$ chip (location of main peak lobe).

The characteristics of the autocorrelation function of FIGS. 7-8 may provide improved multipath signal detection. For example, the leading edges of the sidelobe peaks have differing slopes (absolute value) one from the other (the slope of the leading edge of the first sidelobe peak is 1, while the slope of the leading edge of the second sidelobe peak is 3). Also, the leading edge of the first sidelobe peak has a different slope than the leading edge of the main lobe peak. The differing slopes may result in changes in the respective relative amplitudes and/or relative locations of the sidelobe and/or main lobe peaks in the presence of a multipath signal. The changes in relative amplitude and/or relative separation of the sidelobe and/or main peaks in the presence of one or more multipath signals may provide information useful in detecting and/or estimating multipath error. For another example, the zero crossing points may tend to move in the presence of one or more multipath signals. The changes of the zero crossing points may provide information useful for detecting and/or estimating multipath error.

For the example waveforms depicted in various figures discussed herein, an infinite bandwidth is assumed merely for illustrative purposes. In the case of a limited bandwidth system, for example, the sharp peaks would be more rounded.

For typical SPS autocorrelation computation, a 2 samples per chip sample spacing may be sufficient for adequate code tracking. For BOC signals, however, a 2 samples per chip sample spacing with conventional autocorrelation techniques may result in loss of signal due to the shape of the autocorrelation function waveform between the main peak lobe and the side lobes. Interpolation may also prove problematic due to the shape of the waveform between the main peak lobe and the side lobes.

For an example of an autocorrelation function of a BOC(1,1) signal in accordance with claimed subject matter, the correlation function may be performed by processing only a portion of each chip period. For one example, the portion may comprise a first half of the chip period. For another example, the portion may comprise a second half of the chip period. For example, referring to FIG. 6, boundaries for one chip may be delineated by chip boundaries A and B. The portion of the chip delineated by boundaries A and B that may be processed during autocorrelation processing for one example may comprise the first half portion between boundary A and the middle of the chip period, labeled as portion C, which for this example comprises approximately the first half of the chip period. The region D outside of the first half region C is not processed in this example during autocorrelation processing. Referring to relation 1, above, the chip defined by boundaries A and B may represent the chip period T, and the first half portion C may be represented by the portion ranging from t1-t2, where t1=0 and t2=T/2. For the example using the second half portion D of the chip periods, the second half portion D may be represented by the portion ranging from t1-t2, where t1=T/2 and t2=T.

Note that for this example the first half and second half portions are bounded in part by the BOC signal transition in the middle of each chip. Of course, for these examples the chip period delineated by boundaries A and B is merely one of many chip periods in BOC(1,1) signals that may be correlated in this manner. Further, although this example describes processing the first or second halves of a chip period, other examples are possible with other region sizes as well as other region locations. Examples described herein may provide detection of multipath error due to the characteristics of the autocorrelation functions depicted, by way of non-limiting examples, in FIGS. 8-9.

Figure 9:
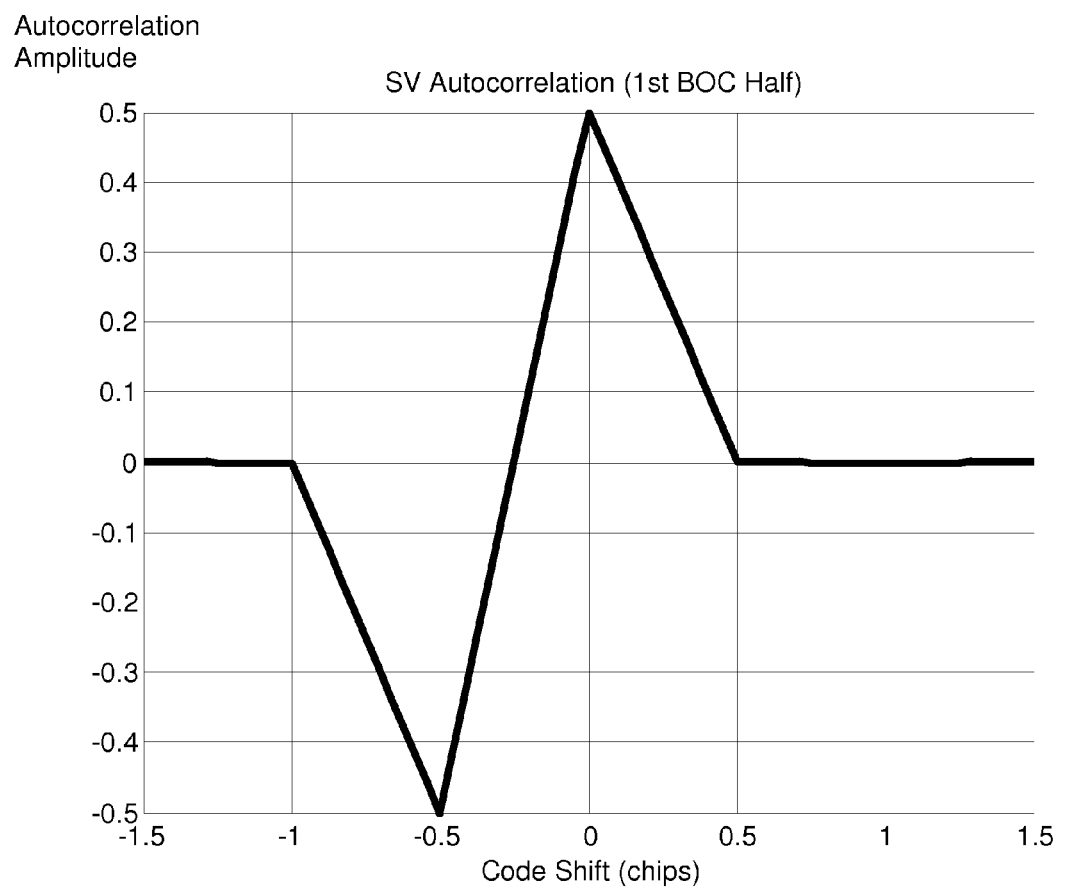
FIG. 9 is a diagram depicting an autocorrelation function for the first half portion of chips in a code sequence of a BOC signal.

FIG. 9 is a diagram depicting an autocorrelation function for the first half chips of a code sequence in a BOC(1,1) signal. As previously mentioned, other examples may perform autocorrelation functions for the second half of the chips of a code sequence of a BOC(1,1) signal. As can be seen in FIG. 9, the autocorrelation function for the first half of the chips of a code sequence of a BOC(1,1) signal has two peaks, each of a magnitude of 0.5 that of the maximum peak amplitude for the conventional BOC autocorrelation function discussed above in connection with FIGS. 7-8. One feature of the autocorrelation function of FIG. 9 is that the leading edges of the two peaks have different (absolute value) slopes. Note that the leading edge of the peak located at chip offset −0.5 has a slope of 1, while the leading edge of the peak located at chip offset 0 has a slope of 2.

The characteristics of the autocorrelation function of FIG. 9 may provide improved multipath signal detection. For example, the differing slopes of the leading edges of the two peaks of the autocorrelation function may result in changes in the relative amplitudes and/or relative locations of the two peaks in the presence of a multipath signal. The two peaks in the ideal case in the absence of any multipath signals have equal absolute value amplitudes and are separated by a distance of 0.5 chips. The changes in relative amplitude and relative separation in the presence of one or more multipath signals may provide information useful in detecting and/or estimating multipath error. For another example, because the two pulses of the autocorrelation function of FIG. 9 are inverted with respect to each other, the zero crossing point (at chip offset −0.25 for this example) may tend to move in the presence of one or more multipath signals. The change of the zero crossing may provide information useful for detecting and/or estimating multipath error.

Figure 10:
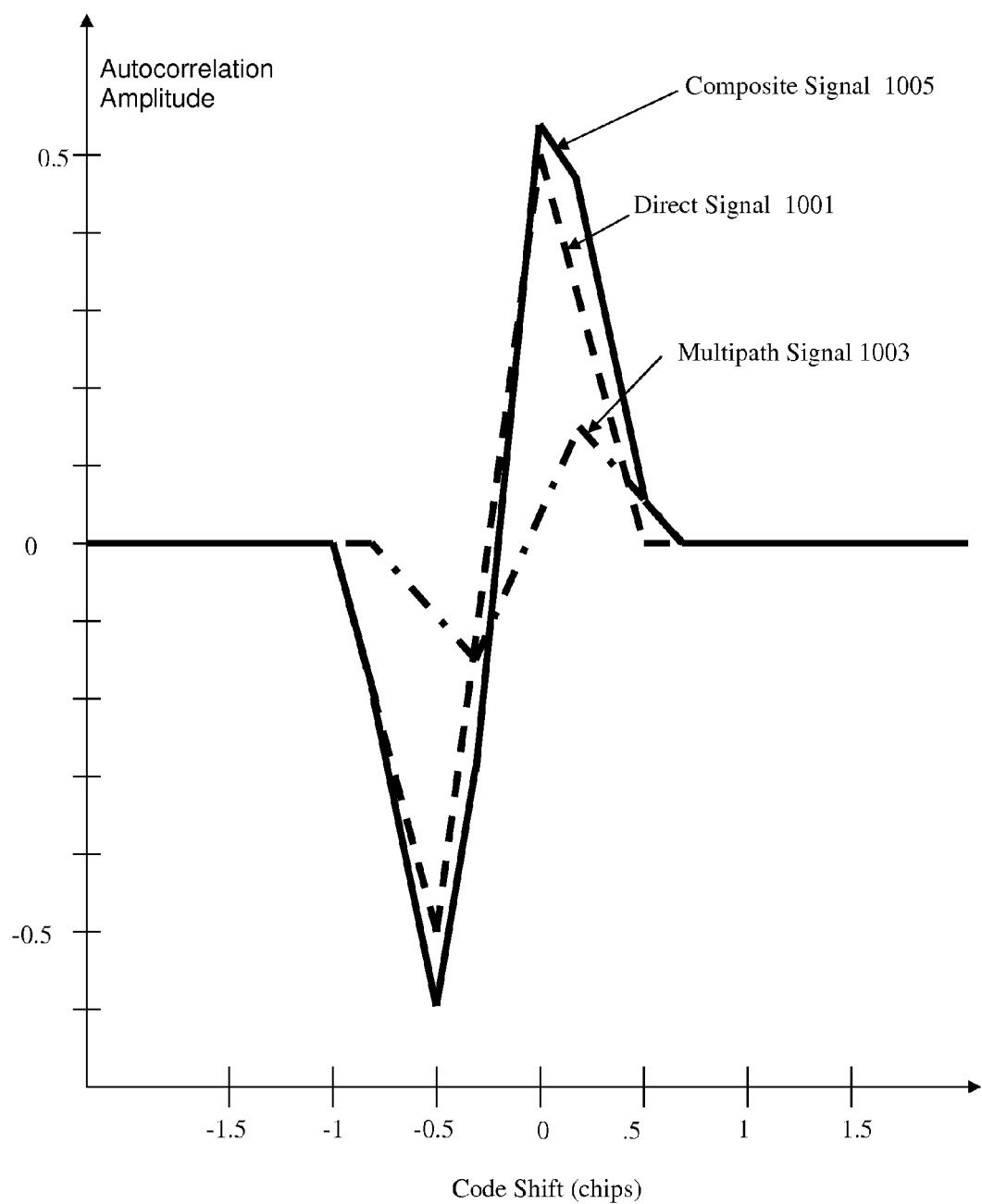
FIG. 10 is a diagram depicting an autocorrelation function for the first half portion of chips in a code sequence of a direct BOC signal combined with a multipath signal with a positive polarity.

FIG. 10 is a diagram depicting an autocorrelation function (composite signal 1005) for the first half of each chip of a direct BOC(1,1) signal 1001 combined with a multipath signal 1003 with a positive polarity. As can be seen, due to the effects of the multipath signal 1003, the autocorrelation function for the composite signal 1005 in this example has two peaks of differing amplitudes. The differing amplitudes may be analyzed to provide multipath error estimation and/or detection. As may also be seen, due to the effects of multipath signal 1003, the zero crossing for composite signal 1005 has moved from −0.25 to a value closer to 0. The change in the zero crossing may be analyzed, either separately or perhaps in conjunction with the differing peak amplitudes, to provide multipath error estimation and/or detection. Multipath signal 1003 for this example is a delayed and reduced amplitude version of direct signal 1001.

Although multipath signal 1003 for this example is depicted as having a positive polarity with respect to direct signal 1001, it is possible for multipath signals to arrive at the receiver with a polarity opposite that of the direct signal. For the situation where the multipath signal has a polarity opposite that of the direct signal, the resulting composite signal will have a reduced amplitude relative to the direct signal due to the cancellation caused by the negative-polarity multipath signal.

In addition to performing multipath error estimation and/or detection via autocorrelation of a BOC(1,1) as described above in connection with FIGS. 7-8 or performing the estimation and/or detection via the first-half correlation described in connection with FIGS. 9-10, other examples may utilize a combination of both approaches. For one example, the differences in the leading edges of the two sidelobe peaks in the correlation described above in connection with FIGS. 7-8 may provide estimation and/or detection information that may be used in conjunction with information gleamed as a result of the differing slopes of the leading edges of the two peaks of the autocorrelation function described in connection with FIGS. 9-10. In one aspect, the changes in the relative amplitude and/or relative separation of the various peaks for the two correlation techniques may be utilized in conjunction with the changes noticed in the zero crossing points for the two correlation techniques to estimate and/or detect multipath error. Utilizing the additional observables available using a combination of correlation techniques may provide additional information to more easily, more accurately, and/or otherwise increase the ability to detect and/or estimate multipath error.

Figure 11:
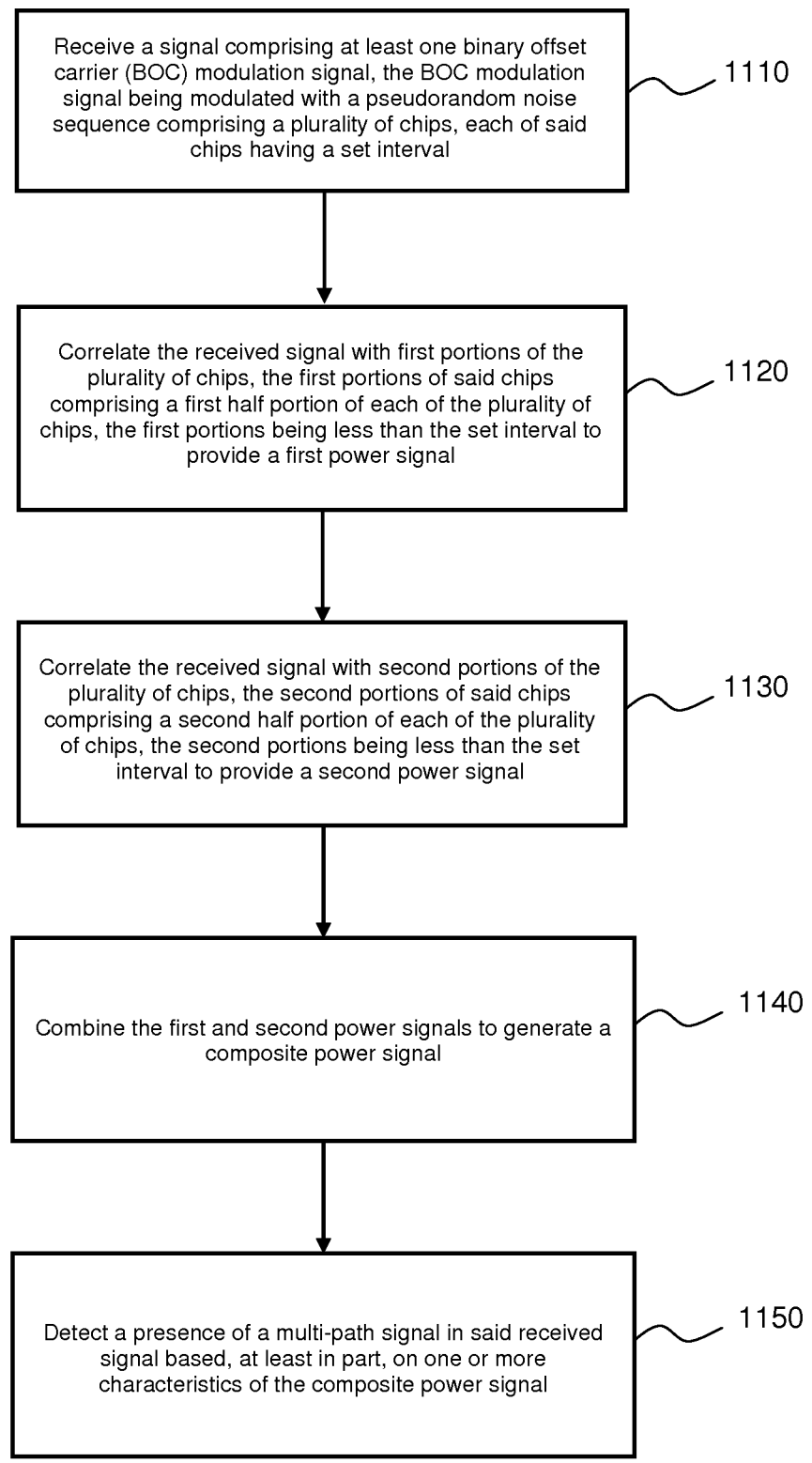
FIG. 11 is a flow diagram of an example method for autocorrelation of a BOC signal by combining a correlation function for the first half of each of a plurality of chips of the BOC signal and a correlation function for the second half of each of a plurality of chips of the BOC signal.

FIG. 11 is a flow diagram of an example method for autocorrelation of a BOC signal by combining a correlation function for the first half of chips of a code sequence of the BOC signal and a correlation function for the second half of each of the chips of a code sequence of the BOC signal. At block 1110, a signal comprising at least one binary offset carrier (BOC) modulation signal is received, the BOC modulation signal being modulated with a pseudorandom noise sequence comprising a plurality of chips, wherein each of the chips has a set interval. At block 1120, the received signal is correlated with first portions of the plurality of chips to provide a first power signal. The first portions of the chips comprise a first half portion of each of the plurality of chips, wherein the first portions are less than the set interval. At block 1130, the received signal is correlated with second portions of the plurality of chips to provide a second power signal. The second portions of the chips comprise a second half portion of each of the plurality of chips, wherein the second portions are less than the set interval. At block 1140, the first and second power signals are combined to generate a composite power signal. At block 1150, the presence of a multi-path signal is detected in said received signal based, at least in part, on one or more characteristics of the composite power signal.

For this example, combining the first and second power signals may comprising adding the power signals. For another example, the two power signals may be subtracted one from another. Further, the two correlation operations may be performed concurrently, at least in part. For other examples the correlation operations may be performed one after the other. A method in accordance with claimed subject matter may include all, more than all, or less than all of blocks 1110-1150. Furthermore, the order of blocks 1110-1150 is merely one example order, and the scope of the claimed subject matter is not limited in this respect.

Figure 12:
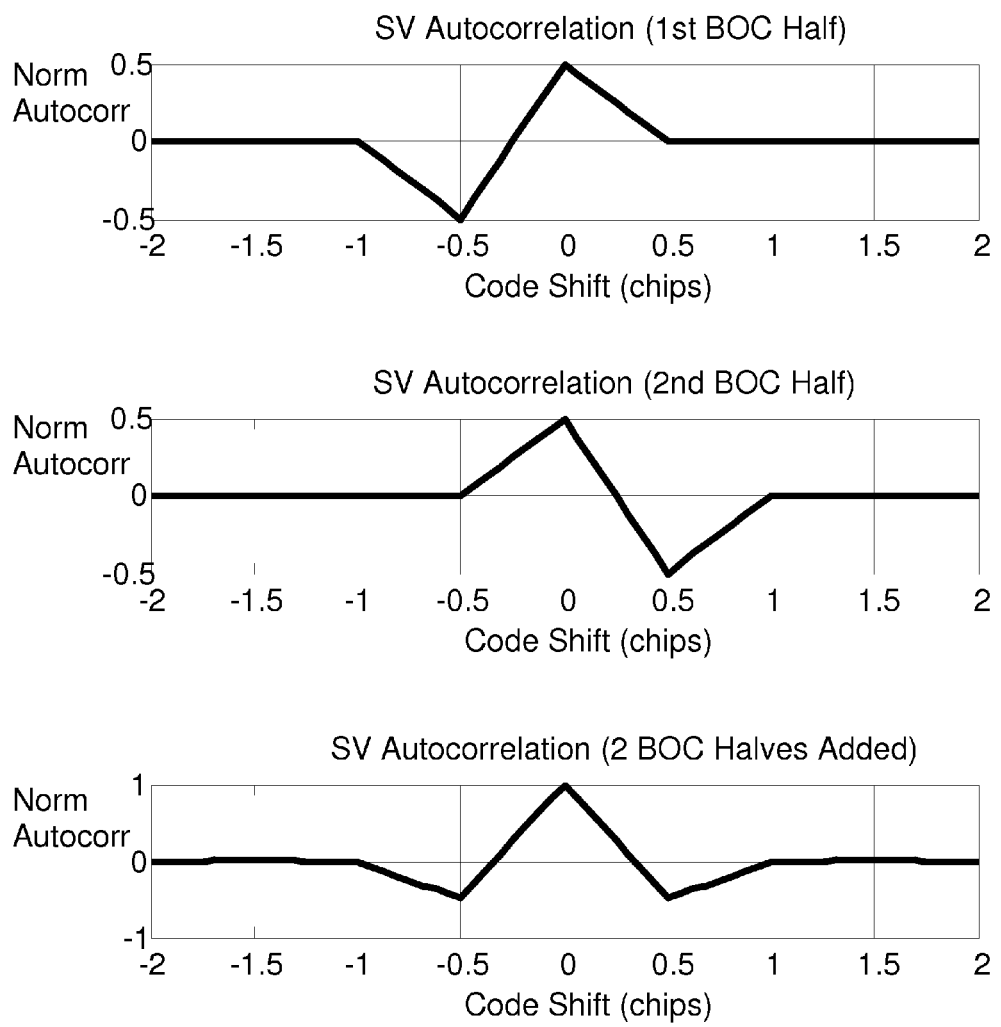
FIG. 12 is a diagram depicting an autocorrelation function for the first half of each chip of a direct BOC signal additively combined with an autocorrelation function for the second half of each chip of a direct BOC signal.

FIG. 12 is a diagram depicting correlation of a BOC signal by adding an autocorrelation correlation function for the first half of chips of a code sequence of the BOC signal to an autocorrelation correlation function for the second half of chips of the code sequence of the BOC signal. The autocorrelation functions may be performed in a manner similar to that discussed above in connection with FIGS. 9-11. For an example, an autocorrelation function is performed on the first half of each of a plurality of chips of a BOC(1,1) signal, thereby producing a function similar to that shown at the top of FIG. 12. An additional autocorrelation is performed on the second half of each of a plurality of chips of the BOC(1,1) signal, producing a function similar to that shown in the middle of FIG. 12. The autocorrelation of the first chip halves may precede the autocorrelation of the second chip halves, or the order of execution may be reversed. Other examples may provide for concurrent autocorrelation processes for the first and second chip halves.

Because the correlation periods between the first chip halves and the second chip halves do not overlap, the two functions may be added together without adding any additional noise. The waveform resulting from adding the autocorrelation functions for the first and second chip halves is depicted at the bottom of FIG. 12. Note that the waveform at the bottom of FIG. 12 is similar to the BOC(1,1) autocorrelation described above in connection with FIG. 8. By processing the two halves separately and then combining them, it may be possible to use simpler and/or more effective autocorrelation processes than may otherwise be possible with conventional BOC(1,1) autocorrelation operations.

Figure 13:
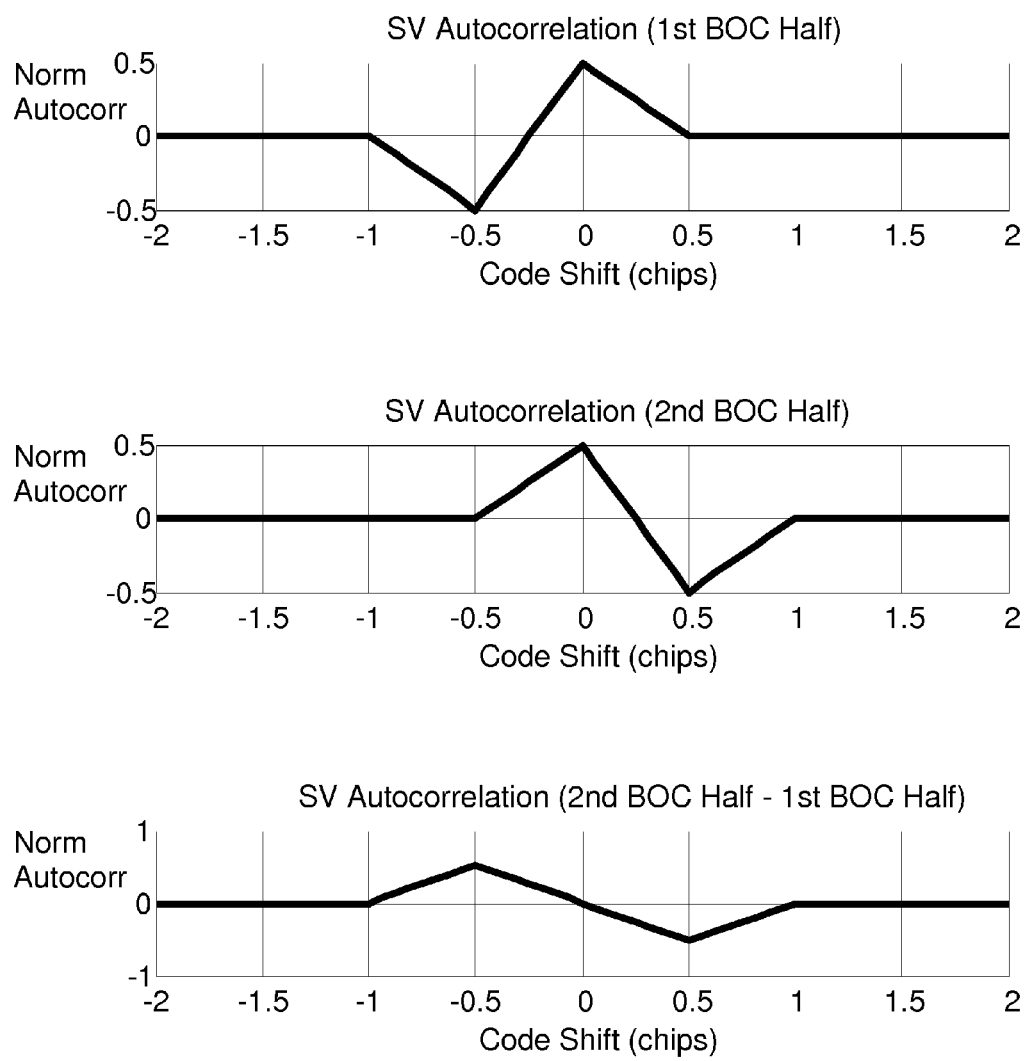
FIG. 13 is a diagram depicting correlation of a BOC signal by subtractively combining a correlation function for the first half of each chip of the BOC signal and a correlation function for the second half of each chip of the BOC signal.

FIG. 13 is a diagram depicting correlation of a BOC signal by subtracting a correlation function for the second half of chips of a code sequence of the BOC signal from a correlation function for the first half of chips of the code sequence of the BOC signal. The autocorrelation functions for this example may be performed in a manner similar to that discusses above in connection with FIGS. 9-11. For an example, an autocorrelation function is performed on the first half of each of chips of a code sequence of a BOC(1,1) signal, thereby producing a function similar to that shown at the top of FIG. 13 (see also the top waveform shown in FIG. 12). An additional autocorrelation is performed on the second half of chips of the code sequence of the BOC(1,1) signal, producing a function similar to that shown in the middle of FIG. 13 (see also the waveform depicted in the middle of FIG. 12). The autocorrelation of the first chip halves may precede the autocorrelation of the second chip halves, or the order of execution may be reversed. Other examples may provide for concurrent autocorrelation processes for the first and second chip halves.

As with the example of FIG. 12, because the correlation periods between the first chip halves and the second chip halves do not overlap, the two autocorrelation functions depicted at the top and in the middle of FIG. 13 may be combined together without adding any additional noise. For this example, the autocorrelation function for the second chip halves is subtracted from that for the first chip halves. The waveform resulting from the subtraction is depicted at the bottom of FIG. 13. By processing the two halves separately and then combining them, it may be possible to use simpler and/or more effective autocorrelation processes than may otherwise be possible with conventional BOC(1,1) autocorrelation operations.

The correlation operation described above in connection with FIG. 13 produces a result similar to what one may obtain by processing a BOC(1,1) signal with a non-BOC(1,1) signal. Two peaks with identical leading edge slopes and identical amplitudes are obtained. From these characteristics, it may be difficult to determine multipath error, as the peaks may experience the same effect from a close multipath signal. However, the zero crossing point may be affected, and multipath detection and/or estimation may be performed using the zero crossing information. This provides an additional technique to estimate and/or detect multipath. Further, the same autocorrelation function may be obtained if a BOC(1,1) modulation is applied to an incoming GPS or other non-BOC signal. In this manner, multipath error may be detected and/or estimated using information gleamed from the zero crossing movement for GPS or other non-BOC signals.

Figure 14:
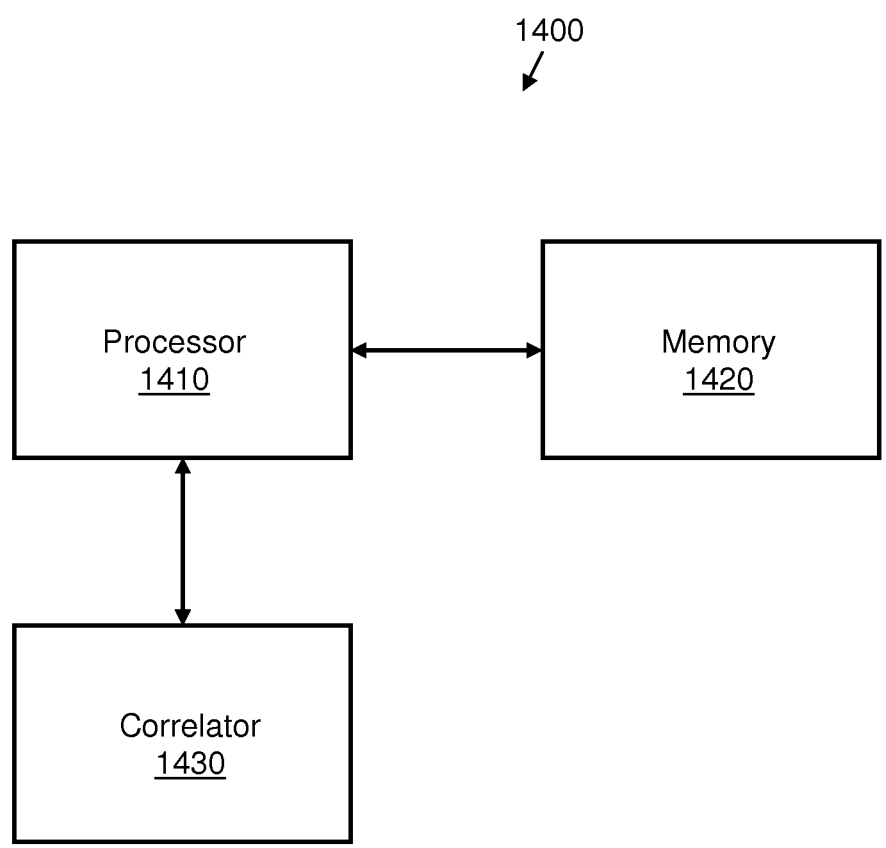
FIG. 14 is a block diagram of an example system for processing binary offset carrier signals derived from PRN codes to determine a position location.

FIG. 14 is an example of a system for acquiring periodically repeating signals from satellites. However, this is merely an example of a system that is capable of acquiring such signals and other systems may be used without deviating from claimed subject matter. As illustrated in FIG. 14, such a system may comprise a computing platform 1400 including a processor 1410, a memory 1420, and a correlator 1430. Correlator 1430 may be adapted to produce correlation functions from signals provided by a receiver (not shown) to be processed by processor 1410, either directly and/or through memory 1420. Correlator 1430 may be implemented in any combination of hardware, software, and/or firmware. However, these are merely examples of how a correlator may be implemented, and claimed subject matter is not limited in these respects.

For an example, memory 1420 may store machine-readable instructions which are accessible and executable by processor 1410 to provide at least a portion of a computing platform. Here, processor 1410 in combination with such machine-readable instructions may be adapted to perform all or portions of processes discussed herein. In a particular example, although claimed subject matter is not limited in these respects, processor 1410 may direct correlator 1430 to search for position determination signals as illustrated above and derive measurements from correlation functions generated by correlator 1430.

Figure 15:
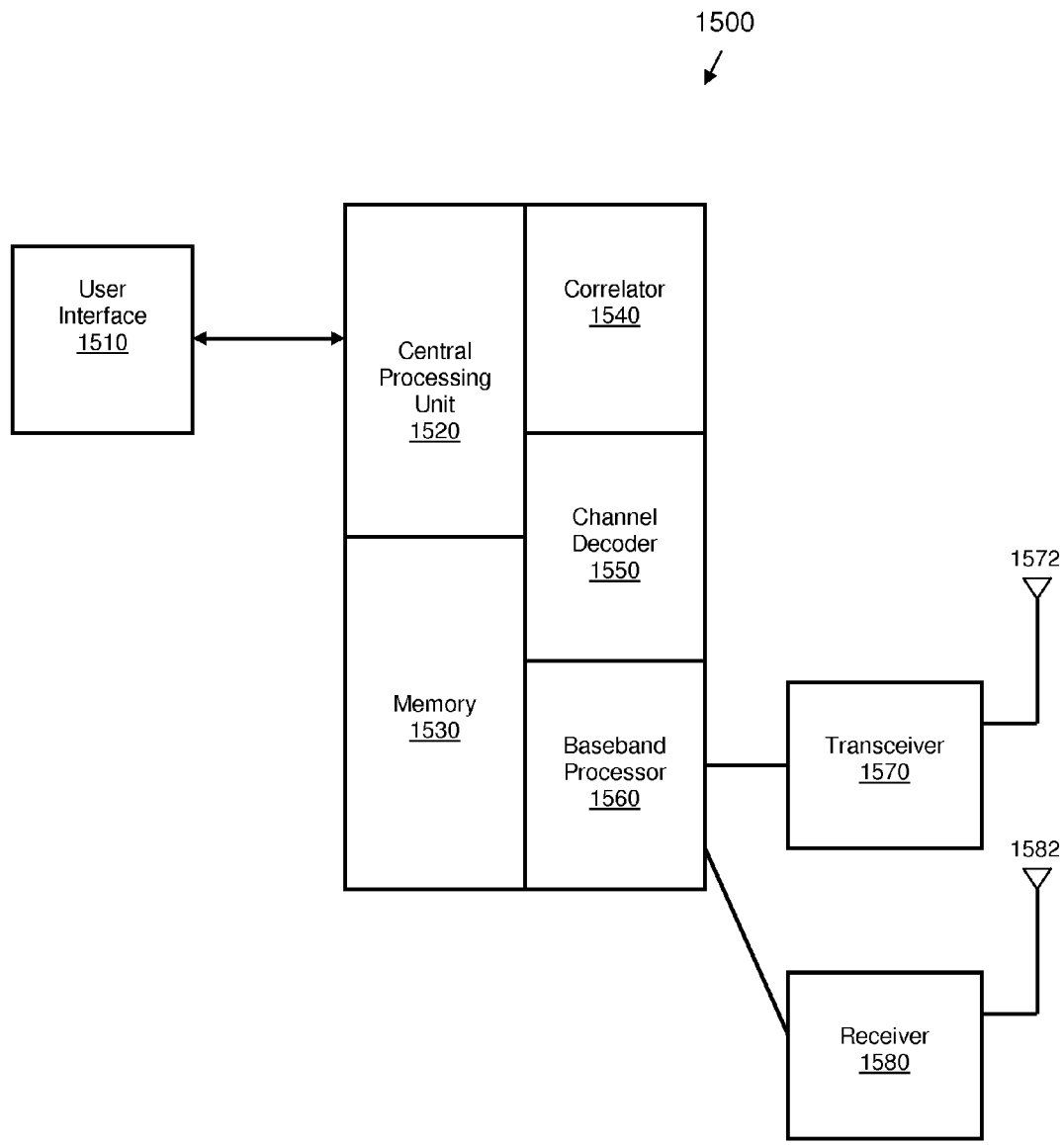
FIG. 15 is a schematic diagram of an example subscriber station.

FIG. 15 is a block diagram of an example subscriber station 1500. A radio transceiver 1570 may be adapted to modulate an RF carrier signal with baseband information, such as voice or data, onto an RF carrier, and demodulate a modulated RF carrier to obtain such baseband information. An antenna 1572 may be adapted to transmit a modulated RF carrier over a wireless communications link and receive a modulated RF carrier over a wireless communications link.

A baseband processor 1560 may be adapted to provide baseband information from a central processing unit (CPU) 1520 to transceiver 1570 for transmission over a wireless communications link. Here, CPU 1520 may obtain such baseband information from an input device within a user interface 1510. Baseband processor 1560 may also be adapted to provide baseband information from transceiver 1570 to CPU 1520 for transmission through an output device within user interface 1510.

User interface 1510 may comprise a plurality of devices for inputting or outputting user information such as voice or data. Such devices may include, by way of non-limiting examples, a keyboard, a display screen, a microphone, and a speaker.

A receiver 1580 may be adapted to receive and demodulate transmissions from satellites, and provide demodulated information to correlator 1540. Correlator 1540 may be adapted to derive correlation functions, for example as illustrated above in relation (1), from the information provided by receiver 1580. For a given PRN code, for example, correlator 1540 may produce a correlation function defined over a range of code phases to set out a code phase search window, and over a range of Doppler frequency hypotheses as described herein. As such, an individual correlation may be performed in accordance with defined coherent and non-coherent integration parameters. Correlator 1540 may also be adapted to derive pilot-related correlation functions from information relating to pilot signals provided by transceiver 1570. This information may be used by a subscriber station to acquire wireless communications services. Channel decoder 1550 may be adapted to decode channel symbols received from baseband processor 1560 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1550 may comprise a turbo decoder.

A memory 1530 may be adapted to store machine-readable instructions which are executable to perform one or more of processes, implementations, or examples thereof which are described or suggested herein. CPU 1520 may be adapted to access and execute such machine-readable instructions. Through execution of these machine-readable instructions, CPU 1520 may direct correlator 1540 to analyze correlation functions provided by correlator 1540, derive measurements from the peaks thereof, and determine whether an estimate of a location is sufficiently accurate. However, these are merely examples of tasks that may be performed by a CPU, and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. A method for multipath detection performed at a subscriber station, the method comprising:
receiving a signal comprising at least one binary offset carrier (BOC) modulation signal, said at least one BOC modulation signal being modulated with a pseudorandom noise sequence comprising a plurality of chips, each chip of said plurality of chips having a chip period;
autocorrelating said received signal to provide a power signal, said autocorrelating comprising:
determining the power signal for a first portion of each chip of said plurality of chips; and
excluding a second portion of each chip of said plurality of chips from the power signal determination, said first portion of each chip and said second portion of each chip being different ones of either a first half of the chip period or a second half of the chip period; and
detecting a presence of a multipath signal in said received signal based, at least in part, on one or more characteristics of said power signal.

2. The method of claim 1, wherein the at least one BOC modulation signal comprises a BOC(1,1) signal.

3. The method of claim 1, wherein said receiving the signal comprises receiving the signal at least in part from a satellite.

4. The method of claim 3, wherein the at least one BOC modulation signal comprises a BOC(1,1) signal.

5. The method of claim 1, wherein said receiving the signal comprises receiving the signal at a subscriber station.

6. The method of claim 1, wherein said detecting the presence of the multipath signal comprises calculating a difference in amplitude between two or more peaks of said power signal.

7. The method of claim 1, wherein said detecting the presence of the multipath signal comprises calculating a distance between two or more peaks of said power signal.

8. The method of claim 1, wherein said detecting the presence of the multipath signal comprises calculating a change in a zero crossing point of the power signal.

9. The method of claim 1, further comprising estimating a multipath signal based at least in part on the one or more characteristics of said power signal.

10. The method of claim 9, wherein said estimating the multipath signal comprises calculating a difference in amplitude between two peaks of said power signal.

11. The method of claim 9, wherein said estimating the multipath signal comprises calculating a distance between two or more peaks of said power signal.

12. The method of claim 9, wherein said estimating the multipath signal comprises calculating a change in a zero crossing point of the power signal.

13. The method of claim 1, wherein said detecting the presence of the multipath signal comprises calculating a difference between a first absolute value of a slope of a leading edge of a first peak of said power signal and a second absolute value of a slope of a leading edge of a second peak of said power signal.

14. A method for multipath detection performed at a subscriber station, the method, comprising:
receiving a signal modulated with a pseudorandom noise sequence comprising a plurality of chips, each chip of said plurality of chips having a chip period;
autocorrelating said received signal to provide a first power signal, said autocorrelating to provide the first power signal comprising:
determining the first power signal for a first portion of each chip of said plurality of chips; and
excluding a second portion of each chip of said plurality of chips from the first power signal determination, said first portion of each chip of said plurality of chips comprising a first half of the chip period and said second portion of each chip of said plurality of chips comprising a second half of the chip period;
autocorrelating said received signal to provide a second power signal, said autocorrelating to provide the second power signal comprising:
determining the second power signal for the second portion of each chip of said plurality of chips; and
excluding the first portion of each chip of said plurality of chips from the second power signal determination;
combining the first power signal and the second power signal to generate a composite power signal; and
detecting a presence of a multipath signal in said received signal based, at least in part, on one or more characteristics of said composite power signal.

15. The method of claim 14, wherein said combining the first power signal and the second power signal comprises adding together the first power signal and the second power signal.

16. The method of claim 14, wherein said combining the first power signal and the second power signal comprises subtracting a first of the first power signal and the second power signal from a second of the first power signal and the second power signal.

17. The method of claim 14, wherein said autocorrelating said received signal to provide the first power signal is performed concurrently with said autocorrelating said received signal to provide the second power signal.

18. A method for multipath detection performed at a subscriber station, the method comprising:
receiving a signal modulated with a pseudorandom noise sequence comprising a plurality of chips, each chip of said plurality of chips having a chip period;
applying a binary offset carrier (BOC) modulation to the received signal to provide a BOC modulated signal;
autocorrelating said BOC modulated signal to provide a power signal, said autocorrelating comprising:
determining the power signal for a first portion of each chip of said plurality of chips; and
excluding a second portion of each chip of said plurality of chips from the power signal determination, said first portion of each chip and said second portion of each chip being different ones of either a first half of the chip period or a second half of the chip period; and
detecting a presence of a multipath signal in said received signal based, at least in part, on one or more characteristics of said power signal.

19. The method of claim 18, wherein said detecting the presence of the multipath signal comprises calculating a change in a zero crossing point of the power signal.

20. An article for multipath detection performed at a subscriber station, the article comprising:
a non-transient storage medium, said non-transient storage medium comprising machine-readable instructions stored thereon which, if executed by a computing platform, are adapted to cause said computing platform to:
receive a signal comprising at least one binary offset carrier (BOC) modulation signal, said at least one BOC modulation signal being modulated with a pseudorandom noise sequence comprising a plurality of chips, each chip of said plurality of chips having a chip period;
autocorrelate said received signal to provide a power signal, said autocorrelation comprising a determination of the power signal for a first portion of each chip of said plurality of chips, the determination of the power signal excluding a second portion of each chip of said plurality of chips, said first portion of each chip and said second portion of each chip being different one of either a first half of the chip period or a second half of the chip period; and
detect a presence of a multipath signal in said received signal based, at least in part, on one or more characteristics of said power signal.

21. The article of claim 20, wherein said instructions adapted to cause said computing platform to detect the presence of the multipath signal comprise instructions adapted to cause said computing platform to calculate a difference in amplitude between two or more peaks of said power signal.

22. The article of claim 20, wherein said instructions adapted to cause said computing platform to detect the presence of the multipath signal comprise instructions adapted to cause said computing platform to calculate a distance between two or more peaks of said power signal.

23. The article of claim 20, wherein said instructions adapted to cause said computing platform to detect the presence of the multipath signal comprise instructions adapted to cause said computing platform to calculate a change in a zero crossing point of the power signal.

24. An article for multipath detection performed at a subscriber station, the article comprising:
a non-transient storage medium, said non-transient storage medium comprising machine-readable instructions stored thereon which, if executed by a computing platform, are adapted to cause said computing platform to:

receive a signal modulated with a pseudorandom noise sequence comprising a plurality of chips, each chip of said plurality of chips having a chip period;

autocorrelate said received signal to provide a first power signal, said autocorrelation to provide the first power signal comprising a determination of the first power signal for a first portion of each chip of said plurality of chips, the determination of the first power signal excluding a second portion of each chip of said plurality of chips, said first portion of each chip of said plurality of chips comprising a first half of the chip period and said second portion of each chip of said plurality of chips comprising a second half of the chip period;

autocorrelate said received signal to provide a second power signal, said autocorrelation to provide the second power signal comprising a determination of the second power signal for the second portion of each chip of said plurality of chips, the determination of the second power signal excluding the first portion of each chip of said plurality of chips;

combine the first power signal and the second power signal to generate a composite power signal; and detect a presence of a multipath signal in said received signal based, at least in part, on one or more characteristics of said composite power signal.

25. An article for multipath detection performed at a subscriber station, the article comprising:

a non-transient storage medium, said non-transient storage medium comprising machine-readable instructions stored thereon which, if executed by a computing platform, are adapted to cause said computing platform to:

receive a signal modulated with a pseudorandom noise sequence comprising a plurality of chips, each chip of said plurality of chips having a chip period;

applying a binary offset carrier (BOC) modulation to the received signal to provide a BOC modulated signal;

autocorrelate said BOC modulated signal to provide a power signal, said autocorrelation comprising a determination of the power signal for a first portion of each chip of said plurality of chips, the determination of the power signal excluding a second portion of each chip of said plurality of chips, said first portion of each chip and said second portion of each chip being different ones of either a first half of the chip period or a second half of the chip period; and detect a presence of a multipath signal in said received signal based, at least in part, on one or more characteristics of said power signal.

26. The article of claim 25, wherein said instructions adapted to cause said computing platform to detect the presence of the multipath signal comprise instructions adapted to cause said computing platform to calculate a change in a zero crossing point of the power signal.

27. A subscriber station for multipath detection, the subscriber station comprising:

a receiver to receive a signal comprising at least one binary offset carrier (BOC) modulation signal, said at least one BOC modulation signal being modulated with a pseudorandom noise sequence comprising a plurality of chips, each chip of said plurality of chips having a chip period; and a correlator to autocorrelate said received signal to provide a power signal, said autocorrelation comprising a determination of the power signal for a first portion of each chip of said plurality of chips, the determination of the power signal excluding a second portion of each chip of said plurality of chips, said first portion of each chip and said second portion of each chip being different ones of either a first half of the chip period or a second half of the chip period;

wherein said subscriber station is further adapted to detect a presence of a multipath signal in said received signal based, at least in part, on one or more characteristics of said power signal.

28. The subscriber station of claim 27, wherein said subscriber station is further adapted to detect the presence of the multipath signal by calculating a difference in amplitude between two or more peaks of said power signal.

29. The subscriber station of claim 27, wherein said subscriber station is further adapted to detect the presence of the multipath signal by calculating a distance between two or more peaks of said power signal.

30. The subscriber station of claim 27, wherein said subscriber station is further adapted to detect the presence of the multipath signal by calculating a change in a zero crossing point of the power signal.

31. A subscriber station for multipath detection, the subscriber station comprising:

a receiver to receive a signal modulated with a pseudorandom noise sequence comprising a plurality of chips, each chip of said plurality of chips having a chip period; and a correlator configured to autocorrelate said received signal to provide a first power signal, said autocorrelation to provide the first power signal comprising a determination of the first power signal for a first portion of each chip of said plurality of chips, the determination of the first power signal excluding a second portion of each chip of said plurality of chips, said first portion of each chip of said plurality of chips comprising a first half of the chip period and said second portion of each chip of said plurality of chips comprising a second half of the chip period, the correlator further configured to autocorrelate said received signal to provide a second power signal, said autocorrelation to provide the second power signal comprising a determination of the second power signal for the second portion of each chip of said plurality of chips, the determination of the second power signal excluding the first portion of each chip of said plurality of chips;

wherein said subscriber station is adapted to combine the first power signal and the second power signal to generate a composite power signal, and wherein said subscriber station is further adapted to detect a presence of a multipath signal in said received signal based, at least in part, on one or more characteristics of said composite power signal.

32. A subscriber station for multipath detection, the subscriber station comprising:

a receiver to receive a signal modulated with a pseudorandom noise sequence comprising a plurality of chips, each chip of said plurality of chips having a chip period; and a correlator to apply a binary offset carrier (BOC) modulation to the received signal to provide a BOC modulated signal and to autocorrelate said BOC modulated signal to provide a power signal, said autocorrelation comprising a determination of the power signal for a first portion of each chip of said plurality of chips, the determination of the power signal excluding a second portion of each chip of said plurality of chips, said first portion of each chip and said second portion of each chip being different ones of either a first half of the chip period or a second half of the chip period;

wherein said subscriber station is adapted to detect a presence of a multipath signal in said received signal based, at least in part, on one or more characteristics of said power signal.

33. The subscriber station of claim 32, wherein said subscriber station is further adapted to detect the presence of the multipath signal by calculating a change in a zero crossing point of the power signal.

34. A subscriber station for multipath detection, the subscriber station comprising:

means for receiving a signal comprising at least one binary offset carrier (BOC) modulation signal, said at least one BOC modulation signal being modulated with a pseudorandom noise sequence comprising a plurality of chips, each chip of said plurality of chips having a chip period;

means for autocorrelating said received signal to provide a power signal, said autocorrelating comprising:
 determining the power signal for a first portion of each chip of said plurality of chips; and
 excluding a second portion of each chip of said plurality of chips from the power signal determination, said first portion of each chip and said second portion of each chip being different ones of either a first half of the chip period or a second half of the chip period; and means for detecting a presence of a multipath signal in said received signal based, at least in part, on one or more characteristics of said power signal.

35. The subscriber station of claim 34, wherein the at least one BOC signal comprises a BOC(1,1) signal.

36. The subscriber station of claim 34, wherein said means for receiving the signal comprises means for receiving the signal at least in part from a satellite.

37. The subscriber station of claim 36, wherein the satellite comprises a Galileo satellite.

38. The subscriber station of claim 34, wherein said means for receiving the signal comprises means for receiving the signal at a subscriber station.

39. The subscriber station of claim 34, wherein said means for detecting the presence of the multipath signal comprises means for calculating a difference in amplitude between two or more peaks of said power signal.

40. The subscriber station of claim 34, wherein said means for detecting the presence of the multipath signal comprises means for calculating a distance between two or more peaks of said power signal.

41. The subscriber station of claim 34, wherein said means for detecting the presence of the multipath signal comprises means for calculating a change in a zero crossing point of the power signal.

42. The subscriber station of claim 34, further comprising means for estimating a multipath signal based at least in part on one or more characteristics of said power signal.

43. The subscriber station of claim 42, wherein said means for estimating the multipath signal comprises means for calculating a difference in amplitude between two peaks of said power signal.

44. The subscriber station of claim 42, wherein said means for estimating the multipath signal comprises means for calculating a distance between two or more peaks of said power signal.

45. The subscriber station of claim 42, wherein said means for estimating the multipath signal comprises means for calculating a change in a zero crossing point of the power signal.

46. A subscriber station for multipath detection, the subscriber station comprising:

means for receiving a signal modulated with a pseudorandom noise sequence comprising a plurality of chips, each chip of said plurality of chips having a chip period;

means for autocorrelating said received signal to provide a first power signal, said autocorrelating to provide the first power signal comprising:
 determining the first power signal for a first portion of each chip of said plurality of chips; and
 excluding a second portion of each chip of said plurality of chips from the first power signal determination, said first portion of each chip of said plurality of chips comprising a first half of the chip period and said second portion of each chip of said plurality of chips comprising a second half of the chip period;

means for autocorrelating said received signal to provide a second power signal, said autocorrelating to determine the second power signal comprising:
 determining the second power signal for the second portion of each chip of said plurality of chips; and
 excluding the first portion of each chip of said plurality of chips from the second power signal determination;

means for combining the first power signal and the second power signal to generate a composite power signal; and means for detecting a presence of a multipath signal in said received signal based, at least in part, on one or more characteristics of said composite power signal.

47. The subscriber station of claim 46, wherein said means for combining the first power signal and the second power signal comprises means for adding together the first power signal and the second power signal.

48. The subscriber station of claim 46, wherein said means for combining the first power signal and the second power signal comprises means for subtracting a first of the first power signal and the second power signal from a second of the first power signal and the second power signal.

49. The subscriber station of claim 46, wherein said autocorrelating said received signal to provide the first power signal is performed concurrently with said autocorrelating said received signal to provide the second power signal.

50. A subscriber station for multipath detection, the subscriber station comprising:

means for receiving a signal modulated with a pseudorandom noise sequence comprising a plurality of chips, each chip of said plurality of chips having a chip period;

means for applying a binary offset carrier (BOC) modulation to the received signal to provide a BOC modulated signal;

means for autocorrelating said BOC modulated signal to provide a power signal, said autocorrelating comprising:
 determining the power signal for a first portion of each chip of said plurality of chips; and
 excluding a second portion of each chip of said plurality of chips from the power signal determination, said first portion of each chip and said second portion of each chip being different ones of either a first half chip period or a second half chip period; and means for detecting a presence of a multipath signal in said received signal based, at least in part, on one or more characteristics of said power signal.

51. The subscriber station of claim 50, wherein said means for detecting the presence of the multipath signal comprises means for calculating a change in a zero crossing point of the power signal.

52. A method for detection of a presence of a multipath signal in a received signal, the method comprising:

receiving a signal modulated with a pseudorandom noise sequence comprising a plurality of chips, each chip of said plurality of chips having a chip period;

autocorrelating said received signal to provide a first power signal, said autocorrelating to provide the first power signal comprising:
  determining the first power signal for a first portion of each chip of said plurality of chips; and
  excluding a second portion of each chip of said plurality of chips from the first power signal determination, said first portion of each chip and said second portion of each chip each comprising a different portion of each chip and each having a duration less than said chip period, wherein said first portion and said second portion are non-overlapping;

autocorrelating said received signal to provide a second power signal, said autocorrelating to provide the second power signal comprising:
  determining the second power signal for the second portion of each chip of said plurality of chips; and
  excluding the second portion of each chip of said plurality of chips from the second power signal determination;

combining the first power signal and the second power signal to generate a composite power signal; and detecting the presence of the multipath signal in said received signal based on one or more characteristics of said composite power signal.

* * * * *